Jan. 9, 1962   R. H. EVERETT   3,015,905
BAIT BOX FOR LIVE CRICKETS
Filed Feb. 17, 1960   2 Sheets-Sheet 2
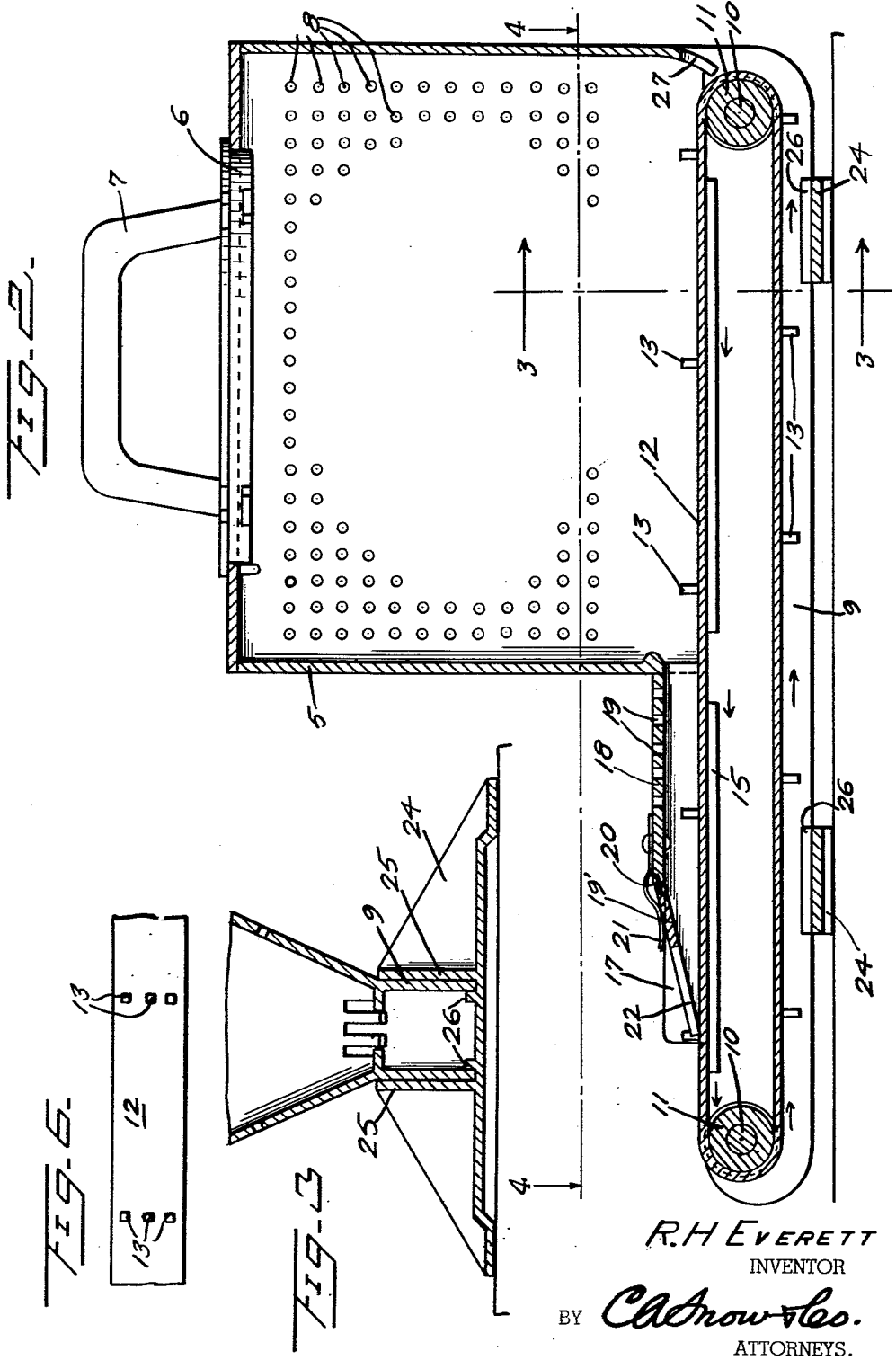
R. H. EVERETT
INVENTOR
BY C. A. Snow & Co.
ATTORNEYS.

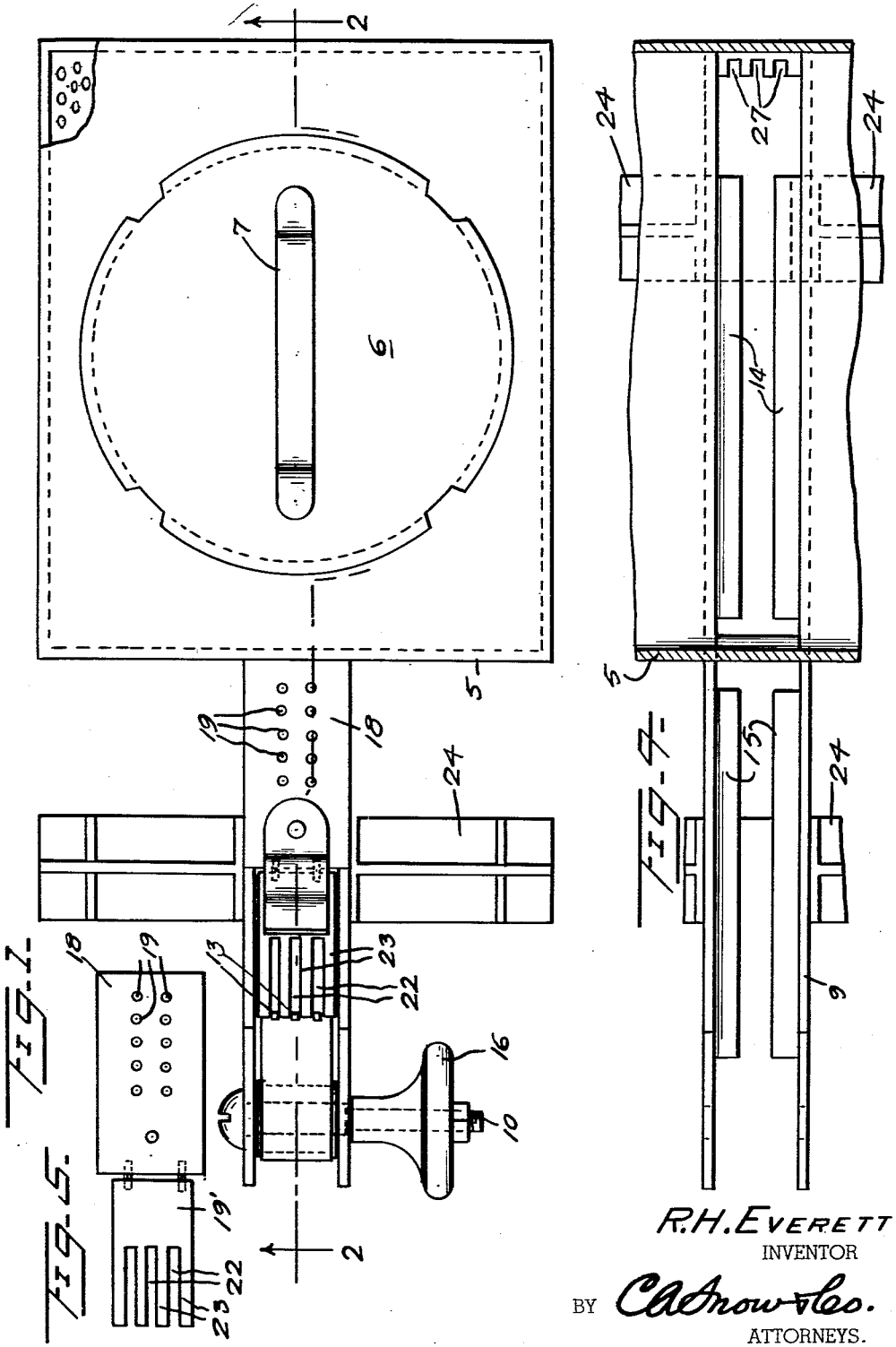

United States Patent Office 3,015,905
Patented Jan. 9, 1962

3,015,905
BAIT BOX FOR LIVE CRICKETS
Robert H. Everett, Rte. 1, Chipley, Fla.
Filed Feb. 17, 1960, Ser. No. 9,357
1 Claim. (Cl. 43—55)

By way of background, it might be stated that fishermen using a box containing crickets, grasshoppers or similar live bait, experience difficulty in removing individual bait for threading on the fishhook, and frequently crickets or other live bait escape with a loss of the bait.

It is therefore the primary object of the present invention to provide a live bait box and particularly to a live bait box for confining and containing crickets or grasshoppers in a live condition.

An important object of the invention is to provide a cricket box which is so constructed and arranged that the crickets may be delivered from a main box-like body portion to a position exteriorly of the container or box-like body portion, without danger of injury to the bait or loss of the bait which usually results when the top of the conventional bait box is removed to extract the bait for fishing purposes.

Another important object of the invention is to provide a bait box of this character wherein an endless belt or conveyor, forming a part thereof and which selects crickets or bait from the main receptacle, will permit the maintaining of the closure of the receptacle in a closed position, under normal conditions.

Still other objects reside in the combinations of elements, arrangements of parts, and features of construction, all as will be more fully pointed out hereinafter and shown in the accompanying drawings, wherein there is disclosed a preferred embodiment of this inventive concept.

In the drawings:

FIGURE 1 is a plan view of a bait box constructed in accordance with the invention.

FIGURE 2 is a longitudinal sectional view taken on line 2—2 of FIGURE 1.

FIGURE 3 is a partial transverse sectional view taken on line 3—3 of FIGURE 2 of the drawings, the belt or conveyor and its supports having been removed.

FIGURE 4 is a fragmental longitudinal sectional view through the lower portion of the container, taken on line 4—4 of FIG. 2, the belt and the supports therefor having been removed.

FIGURE 5 is a plan view of the closure and its support.

FIGURE 6 is a plan view of a portion of the endless conveyor or belt forming a part of the bait box.

Referring to the drawings in detail, the bait box embodies a receptacle indicated generally by the reference character 5, the receptacle being in the form of a hopper having an opening in the top thereof, which is normally closed by means of the removable closure 6 formed with a handle 7 for convenience in operation.

The side walls of the receptacle are formed with a series of openings 8 allowing air to enter the receptacle.

As better shown by FIGURE 3 of the drawings, the lower ends of the side walls of the receptacle 5 extend vertically and are disposed in spaced relation with respect to each other, providing a channel member with extensions at the forward end thereof the extensions of the side walls being indicated by the reference character 9. These side walls are connected at their ends by means of shafts 10 on which the rollers 11 are mounted, the rollers 11 providing a support for the endless conveyor 12 which operates thereover and extends to a point an appreciable distance beyond the front wall of the receptacle, as clearly shown by FIGURE 2 of the drawings.

The extensions 9 extend a substantial distance beyond the front wall of the receptacle 5 forming an open channel member and provide the support for the endless conveyor 12, whereby the bait may be carried to a point exteriorly of the receptacle where they may be individually removed.

Pegs 13 are arranged on the endless conveyor 12, the pegs 13 being disposed in rows transversely of the conveyor 12 so that the bait may be engaged by the cleats and carried forwardly where they may be readily removed by the fisherman. In order that the endless conveyor may be held in a true horizontal position when in operation, inwardly disposed wide flanges 14 are secured to the extensions 9, within the receptacle the confronting edges of the wide flanges being spaced a substantial distance apart, as shown by FIGURE 4 of the drawings. The portions of the extensions 9 extending beyond the forward end of the receptacle 5, are also formed with wide flanges 15 that are spaced apart to the end that the upper flight of the endless conveyor is held in a true horizontal position to prevent the bait from falling laterally from the endless conveyor as the conveyor is being moved through the bottom of the receptacle.

The shaft 10 at the forward end of the extensions 9, is formed with a fingerpiece 16 or knob for effecting rotation of the shafts 10 to operate the endless conveyor moving the endless conveyor, in the direction of the arrows in FIGURE 2 of the drawings, carrying bait to the forward end of the bait box for removal.

Extending upwardly from opposite sides of the trough formed by the extensions 9, are upstanding spaced flanges 17 between which the endless conveyor operates, the flanges 17 guarding the side edges of the endless conveyor to prevent the bait from passing laterally from the endless conveyor.

The reference character 18 indicates a horizontal cover that extends across the space between the upstanding flanges 17, the horizontal cover 18 being provided with a plurality of openings 19 to allow air to enter the receptacle. As shown, this horizontal cover plate 18 provides a support for the hinged closure 19' that is pivotally connected at the forward end of the horizontal cover plate 18, by means of the hinge 20, the forward end of the hinged closure 19' normally resting on the endless conveyor 12, as the conveyor moves over the hinged closure 19.

A leaf spring indicated by the numeral 21 has one of its ends secured to the upper surface of the cover plate 18, the opposite end thereof resting directly on the hinged closure to normally urge the hinge closure downwardly into contact with the endless conveyor as the endless conveyor moves thereunder.

The closure 19 is provided with a series of spaced slots 22 that define fingers 23 adapted to be passed by the pegs that are secured to the belt, the slots allowing the hinged closure 19 to move downwardly into contact with the endless belt, as shown by FIGURE 2 of the drawings.

The bait box is supported by means of the supporting legs 24 that have upstanding flanges 25 and 26 arranged in parallel spaced relation with respect to each other, and between which the extensions 9 of the receptacle are fitted and secured as shown in FIG. 3, the supporting legs 24 being of a construction to insure against the bait box tilting over or upsetting to liberate the bait contained therein.

From the foregoing it will be seen that due to the construction shown and described, I have provided a bait box which includes a hopper-like receptacle with an open bottom discharging bait onto the endless conveyor 12 which when moved forwardly will cause the bait to be carried to a point where they may be readily and easily removed by the fisherman without the danger of other bait escaping.

It might be further stated that at the rear end of the receptacle, the rear end wall of the receptacle extends downwardly and curves inwardly towards the endless belt, where slots 27 are provided, which slots are so arranged that the pegs 13 may pass through the slots and at the same time prevent the bait from escaping between the rear end of the receptacle and the endless belt or conveyor.

What I claim is:

A live bait box and dispenser, comprising a hopper-like container having a front, rear, side and bottom walls, an elongated open channel member disposed along the bottom of said container in communication with the interior of said container, an endless conveyor operating longitudinally within said channel member, transverse rows of plural pegs secured in transverse alignment to the belt conveyor, said channel member extending a substantial distance beyond the front wall of said container, said endless conveyor being adapted to receive bait from said container and delivering the bait to the forwardly extended end of said channel member, a hinged closure having elongated openings aligned with said pegs and adapted to permit said pegs to move therethrough, said closure operating directly over said channel member and normally contacting said endless conveyor, closing the channel member against escape of bait from said container, and means for effecting rotation of said endless conveyor.

References Cited in the file of this patent

UNITED STATES PATENTS

| | | |
|---|---|---|
| 925,487 | Lang | June 22, 1909 |
| 1,280,669 | Copeland | Oct. 8, 1918 |
| 2,518,986 | Griffith | Aug. 15, 1950 |
| 2,658,631 | Kingsley | Nov. 10, 1953 |
| 2,731,131 | Shannon | Jan. 17, 1956 |
| 2,745,209 | Kimball | May 15, 1956 |